United States Patent [19]
Negrin et al.

[11] Patent Number: 5,522,652
[45] Date of Patent: Jun. 4, 1996

[54] METHOD AND SYSTEM FOR CONTROLLING AN ANTI-LOCK BRAKE SYSTEM

[75] Inventors: Dan Negrin, Montreal, Canada; Darryl C. Weber, Ann Arbor, Mich.

[73] Assignee: Kelsey-Hayes Company, Livonia, Mich.

[21] Appl. No.: 475,076

[22] Filed: Jun. 7, 1995

[51] Int. Cl.⁶ .................................................. B60T 8/58
[52] U.S. Cl. .................... 303/154; 303/175; 303/177; 303/183; 303/DIG. 5
[58] Field of Search .................................. 303/154, 171, 303/174, 175, 176, 177, 183, DIG. 5; 364/426.02

[56] References Cited

U.S. PATENT DOCUMENTS

| | | | |
|---|---|---|---|
| 4,729,608 | 3/1988 | Fennel et al. | 303/190 |
| 4,933,858 | 6/1990 | Matsuda | 303/154 X |
| 5,213,398 | 5/1993 | Becker | 303/157 |
| 5,335,178 | 8/1994 | Schafer et al. | 364/426.02 |
| 5,431,488 | 7/1995 | De Vore | 303/176 X |

FOREIGN PATENT DOCUMENTS

| | | | |
|---|---|---|---|
| 5262219 | 10/1993 | Japan | 303/154 |
| 6024317 | 2/1994 | Japan | 303/176 |

*Primary Examiner*—Josie Ballato
*Attorney, Agent, or Firm*—Brooks & Kushman

[57] ABSTRACT

A method and system are disclosed for controlling an anti-lock brake system based on vehicle deceleration. The system includes a wheel speed sensor and control unit for performing the method steps of sensing a wheel speed and determining a wheel deceleration and a vehicle deceleration therefrom. The control unit also performs the method steps of determining an initial deceleration threshold representing a pre-lockup condition, determining a final deceleration threshold based on the vehicle deceleration, comparing the wheel deceleration to the final deceleration threshold, and activating the vehicle anti-lock brake system if the wheel deceleration exceeds the final deceleration threshold.

12 Claims, 4 Drawing Sheets

METHOD AND SYSTEM FOR CONTROLLING AN ANTI-LOCK BRAKE SYSTEM

TECHNICAL FIELD

This invention relates to a method and system for controlling an anti-lock brake system based on the vehicle deceleration.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. An anti-lock brake system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems include vehicle wheel speed sensors for providing inputs to an anti-lock brake system control unit. The control unit controls anti-lock brake system control valves interposed between the brake master cylinder and the individual wheel brakes of an hydraulic brake circuit. Such control valves include isolation valves and reduction valves. The control valves, in turn, regulate hydraulic brake fluid pressure in the individual wheel brakes to implement anti-lock braking.

One known method utilized in identifying an anti-lock braking event includes comparing the velocity of one or more of the vehicle wheels to a reference vehicle velocity. The reference vehicle velocity is an estimate of the true vehicle velocity based on current and previous values of the individual wheel speeds. If the velocity of a wheel is significantly less than the vehicle reference velocity, then the wheel is deemed by the anti-lock brake system to be experiencing a "pre-lockup" condition. The anti-lock brake system then reduces the pressure activating the brake associated with that wheel in order to reduce brake torque. The reduction of brake torque allows the friction force at the surface to accelerate the wheel, thereby causing a reduction of a slip in the wheel.

A second known method of detecting an antilock braking event includes comparing the deceleration of each wheel to a deceleration threshold. The wheel deceleration is determined from the difference between the filtered wheel speed and raw wheel speed. By utilizing wheel deceleration in identifying an anti-lock braking event, a departure of wheel velocity from vehicle velocity will be identified sooner so as to limit the departure.

One problem associated with anti-lock brake systems as described above is their tendency toward false, or premature, activation. Premature activation can occur in a number of circumstances, such as where a road surface is partially ice-covered or bumpy. Such anti-lock brake systems activate when the departure depth of any one of the vehicle wheels exceeds the threshold, despite the fact that the wheel would not have experienced excessive slip.

Another problem associated with anti-lock brake systems as described above is their tendency to initiate drive train excitation. Drive train excitation can occur where a departure is deep and continues for a long period of time. Thus, the continuation of dumping and reapplication of brake pressure causes the engine to oscillate.

SUMMARY OF THE INVENTION

Accordingly, one object of the present invention is to provide a method and system for optimizing the sensitivity of an anti-lock brake system when a vehicle is decelerating quickly.

Another object of the present invention is to provide a method and system for preventing false activation of an anti-lock brake system.

In carrying out the above objects, a method is provided for controlling an anti-lock brake system based on vehicle deceleration. The method comprises sensing a wheel speed and determining a wheel deceleration and a vehicle deceleration therefrom. The method further comprises determining an initial deceleration threshold representing a pre-lockup condition, and determining a final deceleratzon threshold based on the vehicle deceleration. The method still further comprises comparing the wheel deceleration to the final deceleration threshold, and activating the anti-lock brake system if the wheel deceleration exceeds the final deceleration threshold.

The method may further comprise determining a peak acceleration of the wheel. In that event, determining the final deceleration threshold includes adding the peak acceleration to the initial deceleration threshold and decaying the peak acceleration over time.

In further carrying out the above objects, a system is also provided for carrying out the steps of the above-described method. The system includes at least one sensor capable of sensing a wheel speed and generating a signal representative thereof. The system also includes a control unit for determining a wheel deceleration and a vehicle deceleration based on the wheel speed signal. The control unit also determines an initial deceleration threshold representing a pre-lockup condition, and determines a final deceleration threshold based on the vehicle deceleration. The control unit still further compares the wheel deceleration to the final deceleration threshold, and generates a control signal for activating the anti-lock brake system if the wheel deceleration exceeds the final deceleration threshold.

These and other objects, features, and advantages of the present invention will be readily apparent from the following detailed description of the best mode for carrying out the invention when taken in connection with the accompanying drawings.

BEST MODES FOR CARRYING OUT THE INVENTION

Figure 1:
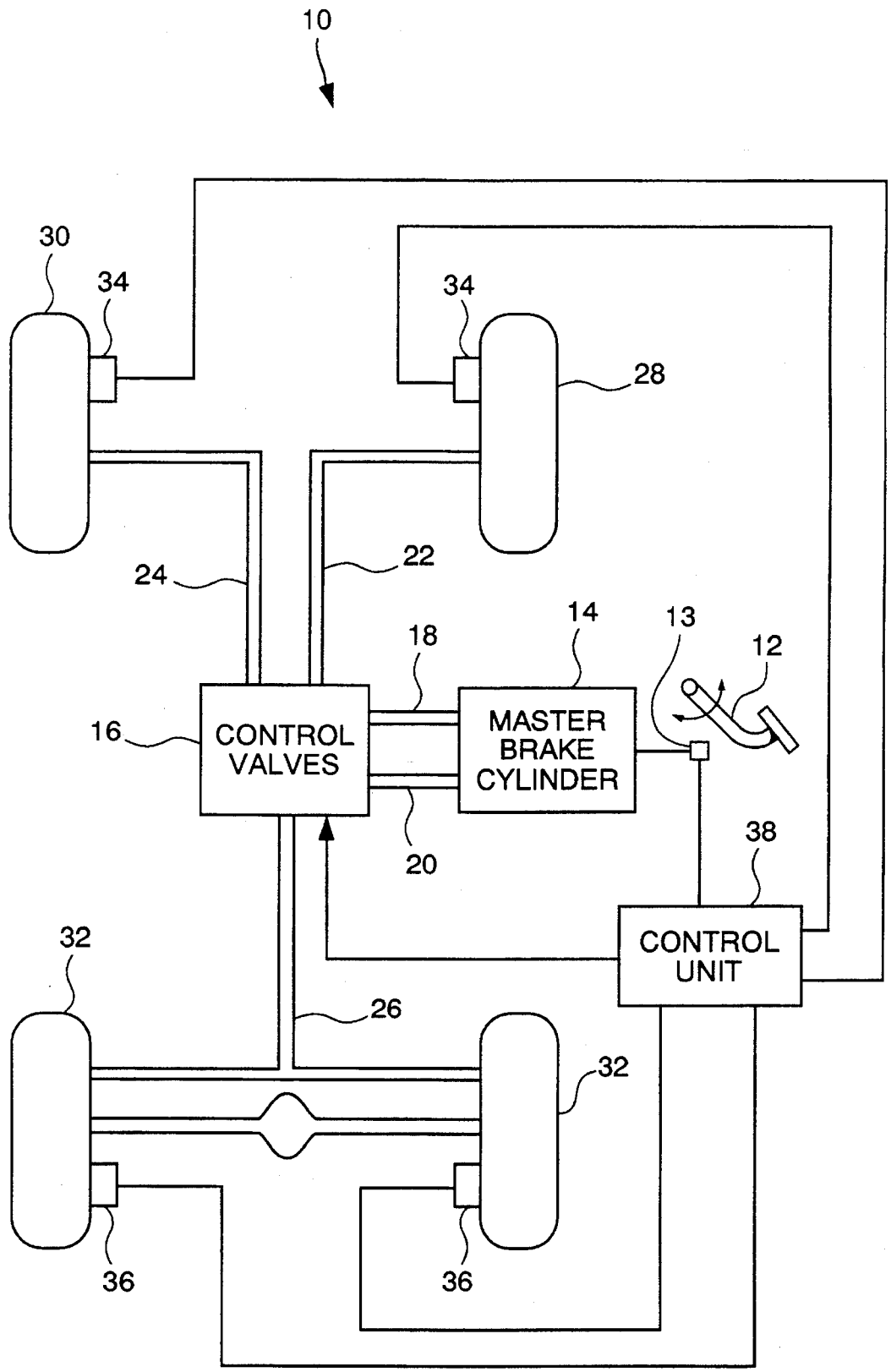
FIG. 1 is a schematic diagram of the anti-lock brake system for use with the method and system of the present invention.

Referring now to FIG. 1, a schematic diagram of the system of the present invention is shown, denoted generally by reference numeral 10, in conjunction with an ordinary passenger vehicle anti-lock brake system (ABS). The anti-lock brake system includes a brake pedal 12, a brake switch 13, a brake master cylinder 14, control valves 16, brake fluid conduits 18, 20, 22, 24, and 26, as well as a right front wheel 28, a left front wheel 30, and a pair of rear wheels 32.

The system 10 of the present invention includes a pair of vehicle wheel speed sensors 34 for measuring the velocity of each of the front wheels 28 and 30, and a pair of vehicle wheel speed sensors 36 for measuring the velocity of each of the rear wheels 32. The system 10 further comprises an anti-lock brake system control unit 38. Each of the wheel sensors 34 and 36 are operatively connected to the control unit 38, which is itself operatively connected to the anti-lock brake system control valves 16. Such operative connections are preferably electrical, but may also be other types of connections, such as fiber optic.

As is well known in the art, each of the wheel speed sensors 34 and 36 may comprise a variable reluctance sensor. However, other well known wheel speed sensors may also be employed.

The control unit 38 takes the form of a commercially available microprocessor. Once programmed, the microprocessor control unit 38 functions as a control means for setting a deceleration requirement for activating the ABS at a predetermined level, such as 4.0 g's. The control unit 38 also functions as a control means for varying the deceleration threshold based on the vehicle deceleration.

Figure 2A:
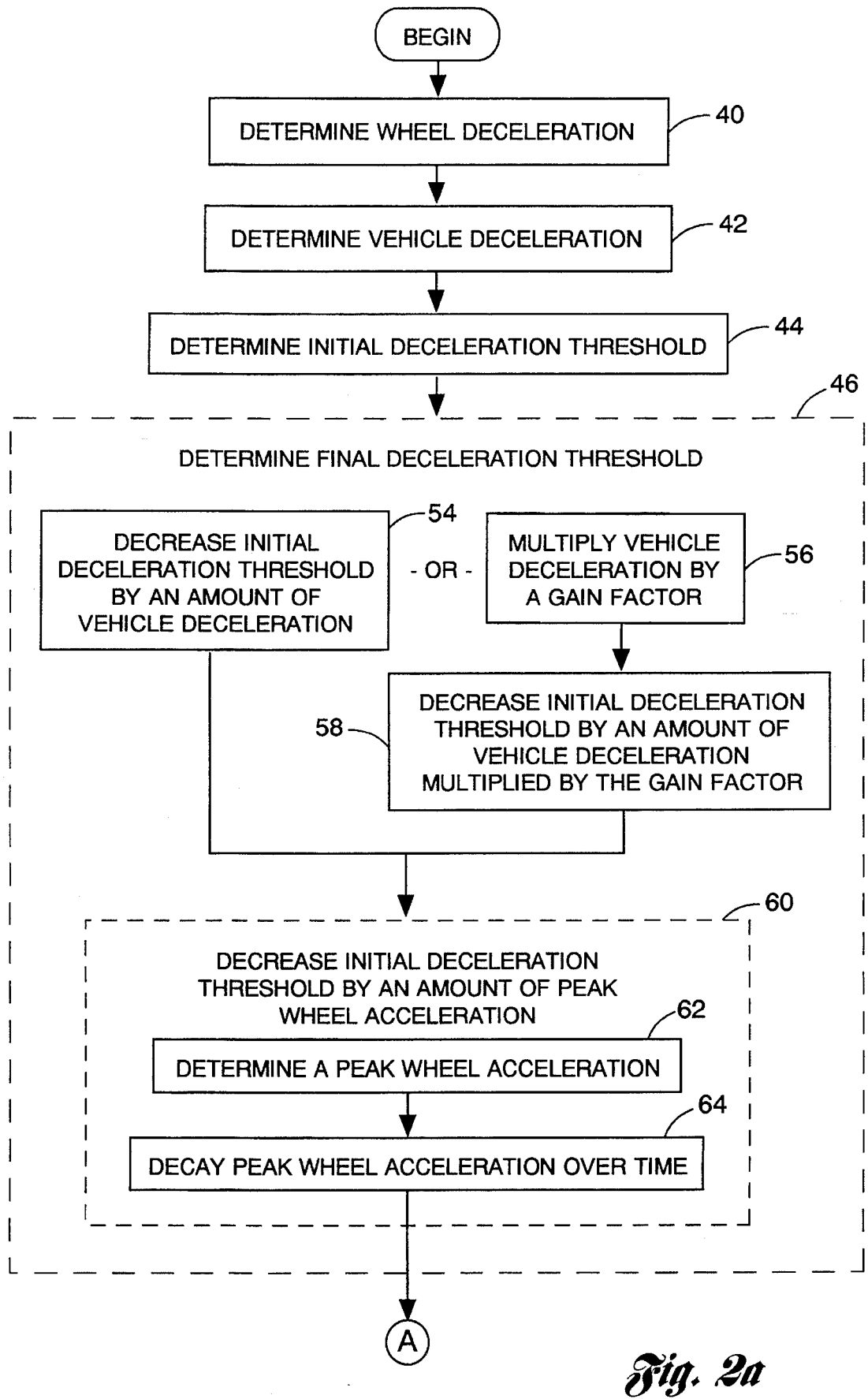
FIGS. 2A–2B are flowcharts illustrating the method of the present invention.
Figure 2B:
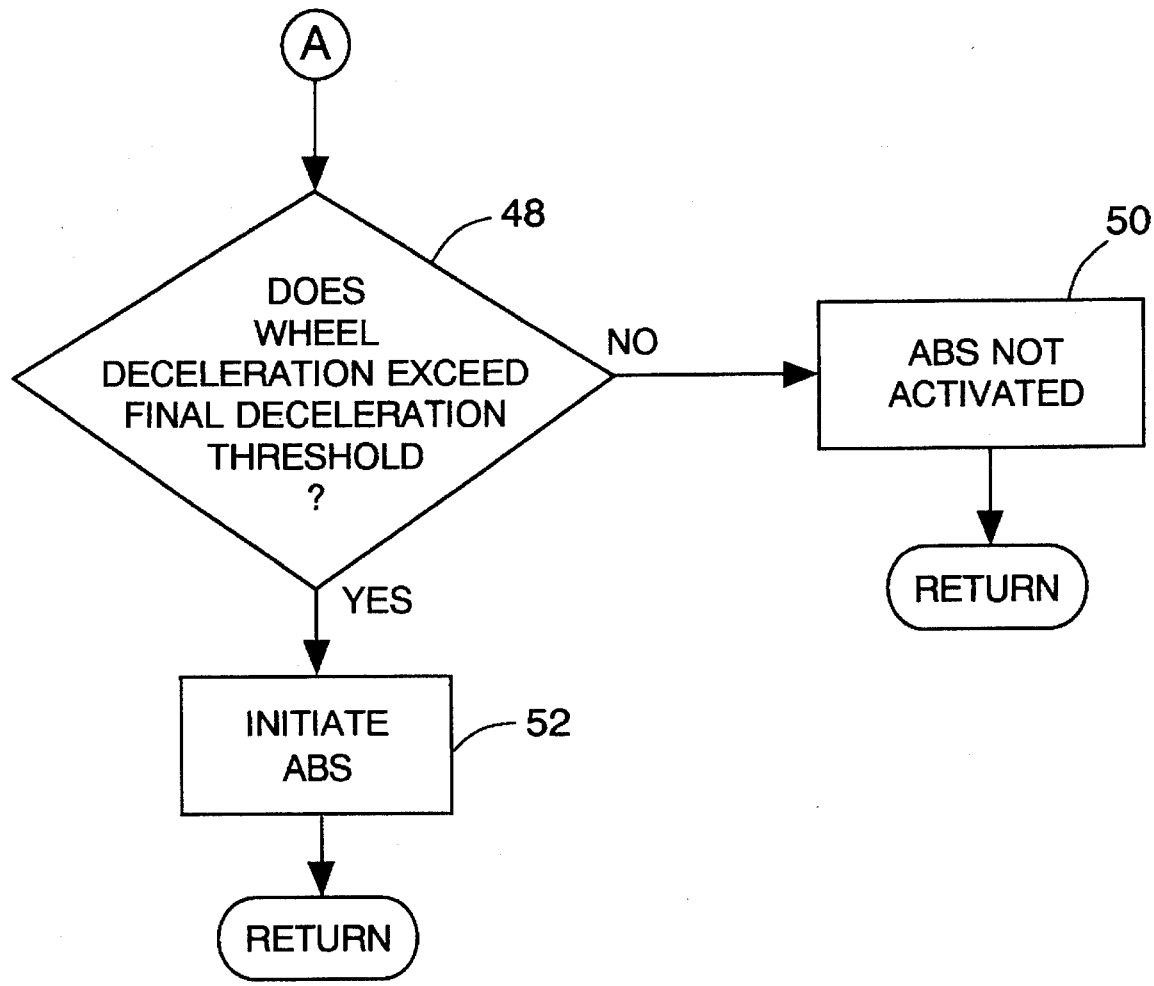

Referring now to FIGS. 2A–2B there is illustrated a method for controlling an anti-lock brake system based on vehicle deceleration. As seen therein, the method includes the steps of determining wheel speed and vehicle speed such as from the history of wheel velocity information provided by the wheel speed sensors 34 and 36.

The method proceeds to block 40 where the wheel deceleration is determined. Wheel deceleration may be derived from the difference between a filtered wheel speed and a raw wheel speed. Thereafter, at block 42, vehicle deceleration is determined. The estimated vehicle deceleration is instrumental in determining surface characteristics and the resulting pressure control. Preferably, the calculation is performed by differentiating the average vehicle speed and then filtering the result.

The method continues with the step of determining an initial deceleration threshold, as shown by block 44. The initial deceleration threshold is a trim constant offset representing the maximum departure allowed for the wheel's rate of deceleration before the anti-lock brake control is initiated. Preferably, the initial deceleration threshold is set at 4 g's.

Next, a final deceleration threshold is determined at block 46. This is preferably accomplished by decreasing the initial deceleration threshold by the amount of vehicle deceleration as shown at block 54. In so doing, the anti-lock brake control system is made sensitive during high vehicle decelerations indicative of a high-mu surface. By lowering the initial deceleration threshold, a departure of the wheel's rate of deceleration from the vehicle's rate of deceleration is detected earlier by the anti-lock brake control system thereby limiting the departure. By limiting the departure, the anti-lock brake control system does not have to cycle the brake pressure as deeply as necessary for deep departures. Drive train excitation (or oscillation) is minimized by the limited cyclic control of the brake pressure.

Also, decreasing the initial deceleration threshold by the vehicle deceleration desensitizes the anti-lock brake control system during periods of low deceleration, such as coasting. In this type of situation, the vehicle operator may not be activating the brake or may be riding the brake, in which case, braking may not be desired. If the anti-lock brake control system is sensitized for low vehicle decelerations, the anti-lock brake system may be activated when a bump in the road is encountered, which is not desirable. Therefore, the method and system of the present invention desensitizes the anti-lock brake control during low vehicle decelerations.

The vehicle deceleration may also be multiplied by a gain factor as shown at block 56, prior to subtracting it from the initial deceleration threshold as shown at block 58. The gain factor also serves to vary the influence of vehicle deceleration in sensitizing the anti-lock brake system.

To further optimize performance of the anti-lock brake system, the method of the present invention inhibits noise, or false activation. False activation is inhibited by increasing the initial deceleration threshold by a peak wheel acceleration, as shown by block 60. Peak wheel acceleration values are positively correlated to road roughness. The physical process that excites tire, suspension and drivetrain vibrations when driving on a rough surface causes rapid wheel oscillations. These rapid wheel oscillations are measured as wheel speed variations. The peak acceleration is determined and stored in a memory as shown at block 62. Since only very recent information is relevant, the value of the peak acceleration is decayed over time, typically at a rate of $\frac{1}{16}$ each 5 msec as shown at block 64.

At block 48, the method continues with the step of comparing the wheel deceleration to the final deceleration threshold. If block 48 is false, the anti-lock brake control is not activated, as shown by block 50. However, if the wheel acceleration does exceed the final deceleration threshold, the anti-lock brake control is initiated, as shown by block 52.

Figure 3:
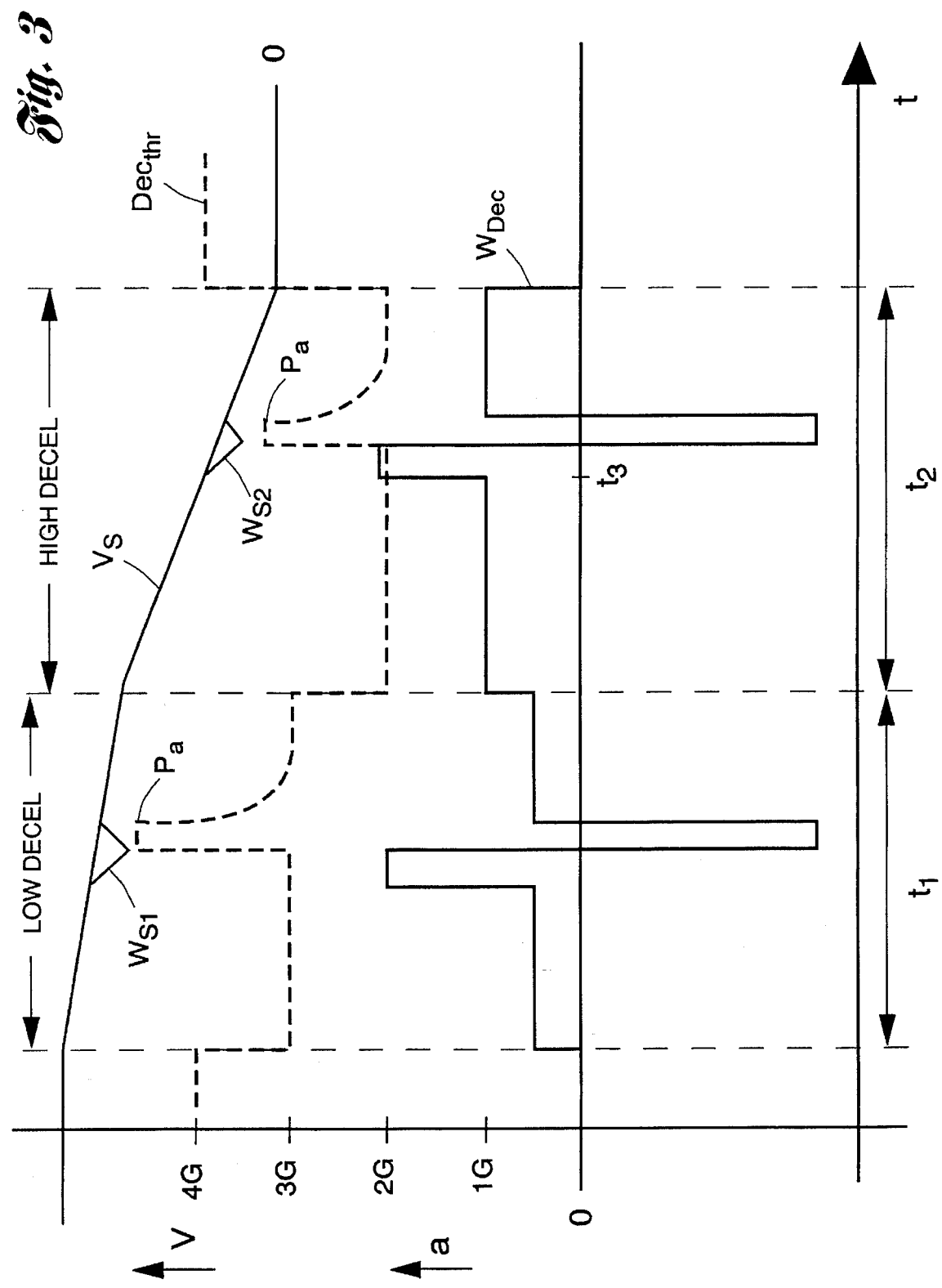
FIG. 3 is a graphical representation of wheel speed versus time illustrating the use of the method of the present invention.

Referring now to FIG. 3, there is shown a graphical representation of wheel speed and vehicle speed versus time illustrating the operation of the anti-lock control system of the present invention. The top portion of the graph illustrates the vehicle speed, $V_s$, and wheel speed, $W_{s1}$, $W_{s2}$, versus time. As seen therein, the vehicle is experiencing a low rate of deceleration during time period $t_1$. During time period $t_2$, the vehicle is experiencing a high rate of vehicle deceleration. Wheel speed departures from the vehicle speed are shown by $W_{s1}$ and $W_{s2}$.

The center portion of the graph illustrates the deceleration threshold, $Dec_{thr}$, versus time, determined according to the method of the present invention as described in detail above. As seen therein, the deceleration threshold, $Dec_{thr}$, decreases as vehicle deceleration increases.

The bottom portion of the graph illustrates the actual wheel deceleration, $W_{Dec}$, versus time. When the wheel speed, $W_{s1}$ departs from the vehicle speed, the actual wheel deceleration, $W_{Dec}$, is not sufficient enough to activate the anti-lock brake control. Therefore, the anti-lock brake system is desensitized during low vehicle decelerations, thereby prohibiting false activation during periods of coasting or riding the brake.

During time period $t_2$, the deceleration threshold, $Dec_{thr}$, has decreased due to the high rate of vehicle deceleration. In this case, when the wheel speed, $W_{s2}$, departs from the vehicle speed, $V_s$, the anti-lock brake system is activated at time period $t_3$. The wheel departure is, therefore, caught sooner during periods off high vehicle deceleration so as to prevent the departure from going very deep, causing high wheel instability.

To further optimize the anti-lock brake control, the peak acceleration, $P_a$, is added to the deceleration threshold, $Dec_{thr}$, and decayed over time. By increasing the threshold by the peak acceleration, $P_a$, the anti-lock brake system is optimized to inhibit activation when travelling over a bumpy road surface.

While the best modes for carrying out the invention have been described in detail, those familiar with the art to which this invention relates will recognize various alternative designs and embodiments for practicing the invention as defined by the following claims.

What is claimed is:

1. A method for controlling a vehicle anti-lock braking system, the method comprising:

sensing a wheel speed and generating a corresponding wheel speed signal;

determining a wheel deceleration based on the wheel speed signal;

determining a vehicle deceleration based on the wheel speed signal;

determining an initial deceleration threshold representing a pre-lockup condition;

determining a final deceleration threshold based on the vehicle deceleration;

comparing the wheel deceleration to the final deceleration threshold; and activating the anti-lock brake system if the wheel deceleration exceeds the final deceleration threshold.

2. The method of claim 1 wherein determining the final deceleration threshold includes decreasing the initial deceleration threshold by the vehicle deceleration.

3. The method of claim 1 wherein determining the final deceleration threshold includes decreasing the initial deceleration threshold by the vehicle deceleration multiplied by a gain factor.

4. The method of claim 1 further comprising determining a peak wheel acceleration.

5. The method of claim 4 wherein determining the final deceleration threshold includes adding the peak wheel acceleration to the initial deceleration threshold.

6. The method of claim 5 wherein determining the final deceleration threshold includes decaying the peak wheel acceleration over time.

7. A vehicle anti-lock brake control system comprising:

a sensor for sensing a wheel speed and for generating a corresponding wheel speed signal; and a control unit coupled to the sensor for performing the following:

determining a wheel deceleration based on the wheel speed signal;

determining a vehicle deceleration based on the wheel speed signal;

determining an initial deceleration threshold representing a pre-lockup condition;

determining a final deceleration threshold based on the vehicle deceleration;

comparing the wheel deceleration to the final deceleration threshold; and generating a control signal for activating the anti-lock brake system if the wheel deceleration exceeds the final deceleration threshold.

8. The system of claim 7 wherein the final deceleration threshold is determined by decreasing the initial deceleration threshold by the vehicle deceleration.

9. The system of claim 8 wherein the final deceleration threshold is determined by decreasing the initial deceleration threshold by the vehicle deceleration multiplied by a gain factor.

10. The system of claim 7 wherein the control unit further performing the following:

determining a peak wheel acceleration of the wheel.

11. The system of claim 10 wherein the final deceleration threshold is determined by adding the peak wheel acceleration to the initial deceleration threshold.

12. The system of claim 11 wherein the final deceleration threshold is determined by decaying the peak wheel acceleration over time.

* * * * *